(12) United States Patent
Nagashima et al.

(10) Patent No.: US 7,820,575 B2
(45) Date of Patent: Oct. 26, 2010

(54) NEAR INFRARED ABSORBENT GREEN GLASS COMPOSITION, AND LAMINATED GLASS USING THE SAME

(75) Inventors: Yukihito Nagashima, Tokyo (JP); Hiromitsu Seto, Tokyo (JP); Harunori Murakami, Tokyo (JP); Hiroyuki Tanaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 889 days.

(21) Appl. No.: 10/581,980

(22) PCT Filed: Dec. 24, 2004

(86) PCT No.: PCT/JP2004/019368

§ 371 (c)(1),
(2), (4) Date: Mar. 20, 2007

(87) PCT Pub. No.: WO2005/063643

PCT Pub. Date: Jul. 14, 2005

(65) Prior Publication Data

US 2008/0026211 A1   Jan. 31, 2008

(30) Foreign Application Priority Data

Dec. 26, 2003 (JP) .............................. 2003-435284

(51) Int. Cl.
 *C03C 3/095* (2006.01)
 *C03C 3/087* (2006.01)
 *B32B 17/10* (2006.01)

(52) U.S. Cl. .............................. 501/64; 501/70; 501/71; 428/426; 428/430; 428/436

(58) Field of Classification Search .................. 501/64, 501/70, 71; 428/426, 430, 436, 437
See application file for complete search history.

(56) References Cited

U.S. PATENT DOCUMENTS

| | | | | |
|---|---|---|---|---|
| 5,077,133 | A | * | 12/1991 | Cheng ........................ 428/426 |
| 5,214,008 | A | * | 5/1993 | Beckwith et al. .............. 501/69 |
| 5,240,886 | A | * | 8/1993 | Gulotta et al. ................ 501/70 |
| 5,362,689 | A | * | 11/1994 | Morimoto et al. ............. 501/70 |
| 5,372,977 | A | | 12/1994 | Mazon-Ramos et al. |
| 5,723,390 | A | * | 3/1998 | Kijima et al. ................. 501/70 |
| 5,817,587 | A | | 10/1998 | Jeanvoine et al. |
| 5,830,568 | A | * | 11/1998 | Kondo ........................ 428/328 |
| 5,897,956 | A | | 4/1999 | Kijima et al. |
| 6,046,122 | A | | 4/2000 | Nagashima et al. |
| 6,335,299 | B1 | | 1/2002 | Foguenne et al. |
| 6,506,700 | B1 | | 1/2003 | Combes et al. |
| 6,753,280 | B2 | * | 6/2004 | Seto et al. ..................... 501/70 |
| 2002/0198094 | A1 | * | 12/2002 | Arbab et al. .................. 501/64 |
| 2003/0083188 | A1 | * | 5/2003 | Seto et al. ..................... 501/71 |
| 2004/0067836 | A1 | * | 4/2004 | Boulos et al. ................. 501/70 |
| 2004/0142811 | A1 | * | 7/2004 | Torr et al. ..................... 501/70 |

FOREIGN PATENT DOCUMENTS

| | | | |
|---|---|---|---|
| EP | 0 887 320 A1 | | 12/1998 |
| JP | 03187946 A | * | 8/1991 |
| JP | 04231347 A | * | 8/1992 |
| JP | 4-310539 A | | 11/1992 |
| JP | 06166536 A | * | 6/1994 |
| JP | 9-208254 | | 8/1997 |
| JP | 09208254 A | * | 8/1997 |
| JP | 10-265239 | | 10/1998 |
| JP | 10-297934 | | 11/1998 |
| JP | 10297934 A | * | 11/1998 |
| WO | WO 96/28394 A1 | | 9/1996 |
| WO | WO 9707356 A1 | * | 2/1997 |

* cited by examiner

*Primary Examiner*—Karl E Group
*Assistant Examiner*—Elizabeth A Bolden
(74) *Attorney, Agent, or Firm*—Hamre, Schumann, Mueller & Larson, P.C.

(57) ABSTRACT

The present invention provides a near-infrared absorbent green glass composition which contains basic glass components and 0.6 to 1.3% total iron oxide amount in terms of $Fe_2O_3$ (T-$Fe_2O_3$), 0 to 2.0% $CeO_2$ and, 300 ppm or less MnO expressed in units of mass and wherein a mass ratio (FeO ratio) of FeO converted into $Fe_2O_3$ relative to the T-$Fe_2O_3$ is from 0.21 to 0.35. Further the glass composition satisfies at least one of the following a) and b):
a) when the glass composition is formed to have a thickness in the range of 1.3 to 2.4 mm, a visible light transmittance is at least 80%, a total solar energy transmittance is 62% or less, a dominant wavelength is from 500 to 540 nm, and an integrated value obtained by integrating transmittance of every 1 nm in the wavelength from 1100 to 2200 nm is 62000 or less;
b) when the glass composition is formed to have a thickness in the range of 3 to 5 mm, a visible light transmittance is at least 70%, a total solar energy transmittance is 45% or less, a dominant wavelength is from 495 to 540 nm, and an integrated value obtained as above is 62000 or less.

12 Claims, No Drawings

NEAR INFRARED ABSORBENT GREEN GLASS COMPOSITION, AND LAMINATED GLASS USING THE SAME

TECHNICAL FIELD

The present invention relates to a near-infrared absorbent green glass composition having a high visible light transmittance, a high infrared absorption capacity and an excellent effect of reducing thermal feeling, and to a laminated glass using this green glass composition.

BACKGROUND ART

Most of the glass sheets for vehicles and buildings are manufactured by a float process, and the glass sheets are called soda-lime-silica glasses due to their basic components. For a window opening for a vehicle and a building, from the viewpoint of the energy saving, an infrared absorbent glass is required. For improving the infrared absorption capacity of the soda-lime-silica glass, an absorption by ferrous oxide (FeO) is utilized.

In addition to the absorption of infrared radiation, the window glass is required to absorb ultraviolet radiation, while required to have a high transmittance of visible light. In particular, with respect to the window glass for a vehicle such as a passenger car, a visible light transmittance to be achieved, which depends on its specific location, is regulated by law in order to ensure visibility. Although the visible light transmittance to be achieved differs country by country, the typical standard is 70% or more.

An infrared and ultraviolet absorbent soda-lime-silica green glass containing about 0.51 to 0.96% by weight $Fe_2O_3$, about 0.15 to 0.33% by weight FeO and about 0.2 to 1.4% by weight $CeO_2$ has been disclosed in JP-A-3-187946. This glass sheet has a visible light transmittance of 70% or more when it has a thickness of about 3 to 5 mm.

Infrared and ultraviolet absorbent soda-lime-silica green glasses have been disclosed also in JP-A-4-231347 and JP-A-6-166536.

On the other hand, a technique to absorb infrared radiation with functional fine particles dispersed in an interlayer film of a laminated glass without relying on glass components has been proposed. A laminated glass using an interlayer film in which ITO (conductive tin-containing indium oxide) ultra-fine particles having a particle size of 0.1 μm or less are dispersed has been disclosed in JP-A-8-259279. This laminated glass reduces scattering of visible light since the size of the ITO fine particles is small.

DISCLOSURE OF THE INVENTION

Reducing the thermal feeling that people feel on their skin caused by sunlight that transmits through the glass is effective to improve comfort in cars or rooms. Although the laminated glass described in JP-A-8-259279 using the interlayer film in which the ITO fine particles are dispersed has an excellent effect of reducing the thermal feeling, the production cost thereof is high since the expensive ITO fine particles are required. In addition, although the ITO fine particles can be applicable to the laminated glass using the interlayer film, application to a single plate is difficult.

A transmittance in the wavelength region of 1100 to 2200 nm greatly affects the thermal feeling, and FeO has an absorption in the wavelength region of 550 to 1600 nm. Thus, in order to reduce the thermal feeling without using the ITO fine particles, it is preferable that the content of FeO in the glass be increased. However, FeO has an absorption even in a visible range and therefore, when the content of FeO simply is increased, the glass sheet is tinged with blue since the visible light transmittance is decreased and the dominant wavelength shifts to the shorter wavelength. As described above, there is the regulation of the visible light transmittance corresponding to the location in the vehicle in which the glass is used. In addition, the mainstream of the color tone of the window glass is green. Therefore, when the content of FeO simply is increased, even though the thermal feeling is reduced, the application of the glass is limited.

Accordingly, it is an object of the present invention to provide a useful near-infrared absorbent glass composition capable to reduce the thermal feeling. It is another object of the present invention to provide a useful near-infrared absorbent glass composition capable of reducing the thermal feeling, particularly having a small thickness, and further to provide a laminated glass using this composition.

A near-infrared absorbent green glass composition of the present invention contains, in mass %, 65 to 80% $SiO_2$, 0 to 5% $B_2O_3$, 0 to 5% $Al_2O_3$, 0 to 10% MgO, 5 to 15% CaO, 10 to 18% $Na_2O$, 0 to 5% $K_2O$, 0 to 2% $TiO_2$, 0.05 to 0.5% $SO_3$, 0.6 to 1.3% total iron oxide amount in terms of $Fe_2O_3$ (hereinafter, referred to as "T-$Fe_2O_3$"), 0 to 2.0% $CeO_2$ and, in mass ppm, 300 ppm or less MnO. In addition to that, a total content of MgO and CaO is from 5 to 20 mass %, a total content of $Na_2O$ and $K_2O$ is from 10 to 20 mass %, and a mass ratio (hereinafter referred to as "FeO ratio") of FeO converted into $Fe_2O_3$ relative to the T-$Fe_2O_3$ is from 0.21 to 0.35. The near-infrared absorbent green glass composition of the present invention satisfies at least one of the following a) and b):

a) when the near-infrared absorbent green glass composition is formed to have a thickness in the range of 1.3 to 2.4 mm, a visible light transmittance measured by using CIE illuminant A is at least 80%, a total solar energy transmittance is 62% or less, a dominant wavelength measured by using CIE illuminant C is from 500 to 540 nm, and an integrated value obtained by integrating transmittances of every 1 nm in the wavelength from 1100 to 2200 nm is 62000 or less;

b) when the near-infrared absorbent green glass composition is formed to have a thickness in the range of 3 to 5 mm, a visible light transmittance measured by using CIE illuminant A is at least 70%, a total solar energy transmittance is 45% or less, a dominant wavelength measured by using CIE illuminant C is from 495 to 540 nm, and an integrated value obtained by integrating transmittances of every 1 nm in the wavelength from 1100 to 2200 nm is 62000 or less.

If the above-mentioned integrated value is 62000 or less, the thermal feeling caused by the sunlight that transmits through the glass is reduced greatly.

When the present invention is applied, the glass composition can be provided which can satisfy a wide variety of required properties even though it has a relatively small plate thickness, for example, the range of 1.3 to 2.4 mm. According to the research of inventors of the present invention, the smaller the thickness of the glass sheet is, the more difficult it is to achieve other optical properties in the practical level while still reducing the thermal feeling. However, the inventors found that the above object can be achieved by treating T-$Fe_2O_3$ as a function of the thickness of the glass sheet. When the near-infrared absorbent green glass composition of the present invention is formed to have a thickness t (mm) of 1.3 to 2.4 mm, it is preferable that TFe (mass %), which is the content of T-Fe$_2$O$_3$, be in the range expressed by equation (1), and that the FeO ratio be from 0.275 to 0.35.

$$1.8 - 0.5t \leq TFe \leq 1.9 - 0.5t \quad (1)$$

Moreover, it is preferable that TCe (mass %), which is the content of CeO$_2$, be 0 or more and in the range expressed by equation (2).

$$t - 1.8 \leq TCe \leq t - 0.8 \quad (2)$$

According to the present invention, the near-infrared absorbent green glass composition is provided that can reduce the thermal feeling and has a green color tone and a high infrared absorption capacity while retaining a high transmittance in a visible range even in a small thickness region.

BEST MODES OF EMBODIMENTS OF THE INVENTION

Hereinafter, the contents of components expressed in % and ppm are all calculated on a mass basis.

In the near-infrared absorbent green glass composition of the present invention, the FeO ratio is preferably from 0.26 to 0.35. Moreover, MnO may be contained as an essential component. In this case, the content is preferably from 30 to 300 ppm.

As an example of the near-infrared absorbent green glass composition of the present invention, the content of T-Fe$_2$O$_3$ is from 0.60 to 0.77% and the content of CeO$_2$ is from 0.55 to 2.0%. In another example, the content of CeO$_2$ is from 0.1 to 2.0 and the FeO ratio is more than 0.275 and not more than 0.35. In yet another example, the content of CeO$_2$ is from 0.1 to 1.4%. In still yet another example, the FeO ratio is more than 0.29 and not more than 0.35. In an example other than the above examples, the content of CeO$_2$ is from 0.65 to 2.0%.

In the near-infrared absorbent green glass composition of the present invention, the content of T-Fe$_2$O$_3$ may be from 0.70 to 0.77%, the FeO ratio may be from 0.275 to 0.35, and the content of CeO$_2$ may be from 0.65 to 1.4%. This composition is suitable for the use with the embodiment wherein the glass composition is formed to have a thickness in the range of 2.1 to 2.4 mm.

In the near-infrared absorbent green glass composition of the present invention, the content of T-Fe$_2$O$_3$ may be from 0.78 to 0.90%, the FeO ratio may be from 0.265 to 0.30, and the content of CeO$_2$ may be from 0.65 to 0.90%. This composition is suitable for the use with the embodiment wherein the glass composition is formed to have a thickness in the range of 2.0 to 2.2 mm.

In the near-infrared absorbent green glass composition of the present invention, the content of T-Fe$_2$O$_3$ may be from 0.77 to 0.80%, the FeO ratio may be from 0.30 to 0.35, and the content of CeO$_2$ may be from 0.65 to 1.0%. This composition also is suitable for the use with the embodiment wherein the glass composition is formed to have a thickness in the range of 2.0 to 2.2 mm.

In the near-infrared absorbent green glass composition of the present invention, the content of T-Fe$_2$O$_3$ may be more than 0.90% and not more than 0.98%, the FeO ratio may be from 0.21 to 0.28, and the content of CeO$_2$ may be 0.50% or more. This composition is suitable for the use with the embodiment wherein the glass composition is formed to have a thickness in the range of 1.7 to 1.9 mm.

In the near-infrared absorbent green glass composition of the present invention, the content of T-Fe$_2$O$_3$ may be from 0.98 to 1.3%, and the FeO ratio may be from 0.275 to 0.35. This composition is suitable for the use with the embodiment wherein the glass composition is formed to have a thickness in the range of 1.3 to 1.8 mm.

Use of the near-infrared absorbent green glass composition of the present invention can achieve the ultraviolet transmittance of 42% or less, preferably 40.5% or less in the case of at least one of the above a) and b), and achieve the ultraviolet transmittance of 40% or less even if the glass composition of the present invention is formed to have a small plate thickness, for example a') the thickness in the range of 1.3 to 2.0 mm.

[Each Component in the Composition]

The reasons for the limitations of the glass composition of the present invention are explained below.

(SiO$_2$)

SiO$_2$ is a main component for forming the skeleton of glass. If the content of SiO$_2$ is less than 65%, the glass has poor durability. If the content thereof exceeds 80%, the glass is difficult to melt. Further, the content of SiO$_2$ is more preferably not less than 69% and less than 72%.

(B$_2$O$_3$)

B$_2$O$_3$ is not an essential component but a component used for improving glass durability or as a melting aid. B$_2$O$_3$ functions also to enhance ultraviolet absorption. If the content of B$_2$O$_3$ exceeds 5%, a decrease of the transmission in the ultraviolet region extends to the visible region so that the color tone of the glass tends to tint yellow. Moreover, the vaporization of B$_2$O$_3$ and the like causes inconvenience during the forming. Consequently, the upper limit of the content of B$_2$O$_3$ should be 5%. The preferable content of B$_2$O$_3$ is from 0 to 2%, excluding 2%.

(Al$_2$O$_3$)

Al$_2$O$_3$ is not an essential component but a component for improving glass durability. Therefore, it is preferable to add Al$_2$O$_3$ at the content of 1% or more. If the content of Al$_2$O$_3$ exceeds 5%, the glass is difficult to melt. Further, since Al$_2$O$_3$ lowers a mean linear expansion coefficient so as to deteriorate the capability of tempering, the content of Al$_2$O$_3$ is preferably 2.5% or less.

(MgO)

MgO is not an essential component but used to improve glass durability and adjust a liquidus temperature and viscosity of the glass during forming. In the present invention, the content of MgO is 10% or less. If the content of MgO exceeds 10%, the liquidus temperature rises. The preferable content of MgO is in the range of over 2% to 5%.

(CaO)

CaO is used to improve glass durability and adjust a liquidus temperature and viscosity of the glass during forming. If the content of CaO is less than 5%, the effects become low. If it exceeds 15%, the liquidus temperature rises.

It should be noted that if the total content of MgO and CaO is less than 5%, the necessary amount of CaO can not be secured. Further, since in order to keep the liquidus temperature and viscosity of the glass during forming, addition of alkaline oxide is required, and it results in low glass durability. When the total content of MgO and CaO exceeds 20%, it is not preferable for the production of the glass since the liquidus temperature rises and the density becomes high. The total content of MgO and CaO is more preferably less than 15%.

(SrO, BaO)

SrO and BaO are not essential components but can be added in order to improve glass durability and adjust a liquidus temperature and viscosity of the glass during forming. Since SrO and BaO are expensive materials, it is not preferable that the content of each exceed 10%.

($Na_2O$, $K_2O$)

$Na_2O$ and $K_2O$, which are alkaline oxides, are used as glass melting accelerators.

If the content of $Na_2O$ is less than 10% or if the total content of $Na_2O$ and $K_2O$ is less than 10%, the efficiency of promoting melting becomes poor. If the content of $Na_2O$ exceeds 18% or if the total content of $Na_2O$ and $K_2O$ exceeds 20%, glass durability is lowered.

It should be noted that $Li_2O$ may be contained as an alkaline oxide. Since $Li_2O$ is a more expensive material than $Na_2O$, it is not preferable that the content of $Na_2O$ exceed 5%.

($TiO_2$)

$TiO_2$ may be added in a small amount to lower the liquidus temperature of the glass. $TiO_2$ is also a component for absorbing ultraviolet radiation. If the content of $TiO_2$ is large, the glass tends to be tinted yellowish. Therefore, the upper limit of the content of $TiO_2$ should be 2%.

($SO_3$)

$SO_3$ is a component that serves to accelerate refining of the glass. If the content of $SO_3$ is less than 0.05%, a sufficient refining effect cannot be attained by a regular melting method. Conversely, if the content of $SO_3$ exceeds 0.5%, $SO_2$, which is produced as a result of decomposition of $SO_3$, remains in the glass in the form of a bubble, or bubbles are generated by reboiling. The preferable range of the content of $SO_3$ is from 0.05 to 0.25%.

(Iron Oxide)

Iron oxide is present in the form of $Fe_2O_3$ and the form of FeO in the glass. $Fe_2O_3$ absorbs ultraviolet radiation and FeO absorbs infrared radiation.

T-$Fe_2O_3$ is obtained by the conversion of the total amount of $Fe_2O_3$ and FeO into $Fe_2O_3$, and the content of T-$Fe_2O_3$ is selected in the range of 0.6 to 1.3%. A mass ratio of FeO converted into $Fe_2O_3$ relative to the T-$Fe_2O_3$ is selected in the range of 0.21 to 0.35.

If the content of T-$Fe_2O_3$ is less than 0.6%, a sufficient ultraviolet and infrared absorption effect can not be obtained. If the content of T-$Fe_2O_3$ exceeds 1.3%, radiant heat from a flame is absorbed significantly at the upper part of the melted glass during melting of the glass material. It thus makes it difficult to heat the glass to near the bottom of the melting furnace during the melting of the glass sufficiently. Moreover, if the content of T-$Fe_2O_3$ exceeds 1.3%, the density of the glass becomes too high.

If the FeO ratio is too low, the infrared absorption effect becomes insufficient. From this viewpoint, the FeO ratio is preferably 0.26 or more, more preferably 0.275 or more, particular preferably 0.29 or more. On the other hand, if the FeO ratio is too high, a streak which is silica-rich or a silica scum is generated easily. Therefore, the FeO ratio is preferably 0.35 or less.

The contents of T-$Fe_2O_3$ and the FeO ratio should be adjusted properly, depending on the thickness to be formed and the like, while other properties are taken into consideration.

($CeO_2$)

$CeO_2$ is not an essential component but a component effective for ultraviolet absorption. In addition, $CeO_2$ is also a component effective to adjust the color tone of the glass without reducing visible light transmittance.

If FeO, which absorbs infrared radiation, is increased and $Fe_2O_3$ is decreased relatively, the color tone of the glass tends to tint blue. In order to retain green color tone without decrease of visible light transmittance, $CeO_2$ may be added as an essential component. If the content of $CeO_2$ is 0.1% or more, preferably 0.65% or more, high ultraviolet absorption capability can be obtained. $CeO_2$ is an expensive material and if this is taken into consideration, the upper limit of the content of $CeO_2$ is preferably 2%, more preferably 1.4%. In this regard, the content of $CeO_2$ also should be adjusted properly, depending on the thickness to be formed and the like, while other properties are taken into consideration.

(MnO)

MnO is not an essential component but may be added in a small amount. In this glass composition, $Fe_2O_3$ and FeO are contained and $CeO_2$ also may be contained at the same time. Therefore, MnO may be added at the content of 30 ppm or more since MnO is an important and effective component to adjust the color tone of the glass and FeO ratio. However, the upper limit of the content of MnO should be 300 ppm, since the effect of tinting (solarization) by MnO itself emerges when the content of MnO becomes high.

(Other Minor Component)

The near-infrared absorbent green glass composition of the present invention may contain other minor components besides the above components. As the minor component, NiO, $Cr_2O_3$, $Mo_2O_3$, ZnO, $SnO_2$, and $La_2O_3$ are exemplified. The total content of the minor components is 10% or less, preferably 5% or less, more preferably 2% or less. It should be note that the more preferable upper limits of the above minor components are 0.01% for NiO, $Cr_2O_3$ and $Mo_2O_3$, 0.1% for ZnO, and 1% for $SnO_2$ and $La_2O_3$.

[Optical Property; Relationship Between Optical Property and Thermal Feeling]

With respect to the near-infrared absorbent green glass composition of the present invention, the visible light transmittance and the dominant wavelength is set within the practically desirable range mainly by adjusting the contents of T-$Fe_2O_3$, $CeO_2$ and MnO, and FeO ratio. In addition, in the preferable embodiment, preferable optical properties such as low ultraviolet transmittance are acquired by adjusting the above contents properly while taking the thickness to be formed into account.

Further, in the near-infrared absorbent green glass composition of the present invention, transmittance in the wavelength of 1100 to 2200 nm is lowered. There is a correlation between the transmittance in this wavelength region, specifically the integrated value obtained by integrating the transmittances (%) of every 1 nm in wavelength from 1100 to 2200 nm, and the thermal feeling that people feel on their skin. In other words, the greater the above-mentioned integrated value is, the stronger the thermal feeling is. This integrated value can be a better indicator for showing the extent of the thermal feeling as compared with other optical properties such as total solar energy transmittance.

[Transmittance for Thermal Feeling]

As explained above, in order to describe the relationship between the optical property and the thermal feeling, evaluation using the transmittance in the wavelength of 1100 to 2200 nm is appropriate. Moreover, for the finer evaluation, transmittance for thermal feeling is defined as below.

(Relationship Between Rise in Skin Temperature and Thermal Feeling)

First, the relationship between a range of the rise in skin temperature by the incident sunlight and the thermal feeling that people feel on their skin was evaluated. The procedure for the evaluation was as follows. A filter was attached to light flux radiated from a xenon lamp (SERIC LTD.: XC-500E) to give an illuminant which has an equal to the energy distribution of sunlight. A panel having a hole with a diameter of 50 mm was placed at the point which was 416 mm away from the illuminant. A back of the subject's hand was placed at the hole on the other side of the illuminant, and the temperature of the back of the subject's hand was measured every 3 seconds using a thermo-viewer. The subject announced the thermal feeling on the five scales of (1) slightly warm, (2) warm, (3) slightly hot, (4) hot, and (5) very hot. With respect to the thermal feeling people feel, the results of the experiments performed on 81 subjects were summarized. As a result, the rise in skin temperature and the thermal feeling have a proportional relation, and 0.5° C. rise in skin temperature makes the thermal feeling go up by about one scale. Further, it is confirmed that people do not feel "very hot" when the range of the rise in skin temperature is 3.2° C. or less.

(Sensitivity Ratio for Thermal Feeling)

An extent of the rise in skin temperature depends on the wavelength of the sunlight. The extent of the rise in skin temperature depending on the wavelength is quantified as a coefficient at the wavelength (sensitivity ratio for thermal feeling; hereinafter referred to as "SRTF"). The SRTF in the wavelength region of 300 to 840 nm and the SRTF in the wavelength region of 840 to 1350 nm are reported to be 1.43 and 1, respectively, when the value of the SRTF in the wavelength region of 840 to 1350 nm is set to 1. However, with respect to the wavelength region of 1350 to 2500 nm, the SRTF is not reported although it greatly affects the thermal feeling. Therefore, the SRTF in this wavelength region was determined by an experiment performed using the light of the wavelength region of 1350 to 2500 nm which was picked up by replacing the filter from the above illuminant. This experiment also performed by measuring the rise in the temperature of the back of the subject's hand. The SRTF in the wavelength region of 1350 to 2500 nm was 3.34. The SRTF in the wavelength region of less than 300 nm and the SRTF in the wavelength region of more than 2500 nm can be assumed to be substantially 0. The sensitivity ratios for thermal feeling in each wavelength region are collectively shown in Table 1.

TABLE 1

| Wavelength region/nm | Sensitivity ratio for thermal feeling |
| --- | --- |
| <300 | 0 |
| 300 to 840 | 1.43 |
| 840 to 1350 | 1 |
| 1350 to 2500 | 3.34 |
| >2500 | 0 |

(Transmittance for Thermal Feeling)

When the product of the spectral transmittance of the glass sheet and the solar spectrum is weighted using the sensitivity ratio for thermal feeling shown in Table 1, the thermal feeling that people actually feel can be described with accuracy using the optical property of the glass sheet. Here, "transmittance for thermal feeling (Ttf, Transmittance for thermal feeling)" is defined by the following equation.

$$T_{tf} = \frac{\int_0^\infty I_{sun}(\lambda) \cdot T_{glass}(\lambda) \cdot SR(\lambda) d\lambda}{\int_0^\infty I_{sun}(\lambda) \cdot T_{air}(\lambda) \cdot SR(\lambda) d\lambda} \quad \text{Equation 1}$$

Here, $I_{sun}(\lambda)$ is the solar spectrum at Air mass 1.5 defined by ISO9845-1, $T_{glass}(\lambda)$ is the spectral transmittance of the glass sheet, and $SR(\lambda)$ is the sensitivity ratio for thermal feeling shown in Table 1. $T_{air}(\lambda)$ is the spectral transmittance of air and here assumed to be 1 irrespective of the wavelength.

The relationship between the range of the rise in skin temperature by the sunlight that transmits through the glass sheet and the transmittance for thermal feeling defined by the above equation was confirmed by evaluating as below. In the above-mentioned evaluation apparatus, a glass sheet or a laminated glass was placed roughly at the midpoint of the illuminant and the back of the subject's hand with a normal to a glass plane forming the angle of 30 degrees with a line connecting the illuminant and the back of the subject's hand, and the range of the rise in skin temperature was measured. With respect to the range of the rise in skin temperature, the results of the experiments performed by 111 subjects were summarized. As a result, it is confirmed that there is good correlation between the rise in skin temperature and the transmittance for thermal feeling.

Moreover, as the result of the above research, it is found that in order to not make people feel very hot, the window glass that makes the rise in skin temperature 3.5° C. or less should be used, that is to say, the transmittance for thermal feeling (Ttf) of the glass sheet or the laminated glass used as a window glass should be 44% or less, preferably 42% or less, more preferably 40% or less.

[Laminated Glass]

By using a glass sheet including the near-infrared absorbent green glass composition of the present invention, a laminated glass can be composed. This laminated glass may be produced according to the conventionally known method.

For example, this laminated glass is formed by laminating at least two glass sheets through a thermoplastic resin layer, and at least one of the glass sheets is the near-infrared absorbent green glass composition of the present invention. The at least two glass sheet constituting the laminated glass may include the near-infrared absorbent green glass composition of the present invention.

The laminated glass of the present invention preferably has a visible light transmittance measured by using CIE illuminant A of 70% or more and a total solar energy transmittance of 45% or less, and more preferably, the ratio of the above total solar energy transmittance relative to the above visible light transmittance is 0.60 or less. Further, the laminated glass of the present invention preferably has a transmittance at the wavelength of 1550 nm of 37% or less and the integrated value obtained by integrating transmittances of every 1 nm in the wavelength from 1100 to 2200 nm is preferably 34000 or less. Furthermore, the laminated glass of the present invention preferably has the transmittance for thermal feeling of 44% or less.

Hereinafter, the present invention is described in further detail with reference to examples thereof, but it should be noted that the following examples as well as the foregoing are merely illustrative examples of the preferable embodiments of the present invention.

Silica sand, dolomite, limestone, soda ash, mirabilite, potassium carbonate, carbon, iron oxide, titanium oxide, cerium oxide, and blast-furnace slag were blended according to composition of the glass shown in Tables 2 and 3 and the batch was obtained. The batch was melted in an electric furnace at 1450° C. After the batch was kept molten for 4 hours, the resultant molten glass was cast on a stainless-steel plate. After the glass sheet thus obtained was placed for 30 min in an annealing furnace wherein the temperature was kept at 650° C., the annealing furnace was turned off so that the glass sheet was annealed to room temperature. The annealed glass sheet was polished so as to have a prescribed thickness and subjected to various measurements.

The properties of each glass sheet measured are shown in Tables 2 and 3. It should be noted that the case where the total of the contents in the table is not 100% is caused by different significant digits being used.

In Tables 2 and 3, $Y_A$ means the visible light transmittance measured by using CIE illuminant A, $T_G$ means the total solar energy transmittance, $D_w$ means the dominant wavelength measured by using CIE illuminant C, $T_{UV}$ means the ultraviolet transmittance measured based on the solar spectrum with the energy distribution at Air mass 2, Pe means the excitation purity measured by using CIE illuminant C, $T_{850}$ and $T_{1550}$ are the transmittances at the wavelength of 850 nm and 1550 nm, respectively, and integrated value means the value obtained by integrating transmittances of every 1 nm in the wavelength from 1100 to 2200 nm. It should be noted that $T_{UV}$ was obtained more specifically as a ratio of ultraviolet light energy calculated by integrating within the wavelength range from 300 to 400 nm of the solar spectrum which transmitted the sample relative to ultraviolet light energy calculated by integration within the wavelength range from 300 to 400 nm having the energy distribution of the solar spectrum at Air mass 2 reported by Parry Moon.

TABLE 2

| | Examples (single plate) | | | | | | |
|---|---|---|---|---|---|---|---|
| | 1 | 2 | 3 | 4 | 5 | 6 | 7 |
| $SiO_2$ | 70.4 | 70.2 | 70 | 70 | 69.9 | 70 | 70 |
| $Al_2O_3$ | 1.6 | 1.6 | 1.6 | 1.6 | 1.6 | 1.5 | 1.6 |
| $Na_2O$ | 14.3 | 14.4 | 14.5 | 14.2 | 14.3 | 14.3 | 14.3 |
| $K_2O$ | 0.5 | 0.5 | 0.5 | 0.5 | 0.5 | 0.5 | 0.5 |
| MgO | 3.2 | 3.2 | 3.2 | 3.2 | 3.2 | 3.2 | 3.2 |
| CaO | 8.8 | 8.8 | 8.8 | 8.8 | 8.8 | 8.8 | 8.8 |
| $TiO_2$ | 0.05 | 0.05 | 0.05 | 0.05 | 0.05 | 0.05 | 0.05 |
| $T\text{-}Fe_2O_3$ | 1.20 | 1.10 | 0.98 | 0.85 | 0.81 | 0.81 | 0.78 |
| $CeO_2$ | 0 | 0.20 | 0.50 | 0.90 | 0.91 | 0.91 | 0.88 |
| $SO_3$ | 0.18 | 0.17 | 0.17 | 0.18 | 0.18 | 0.17 | 0.17 |
| MnO/mass ppm | 40 | 80 | 120 | 150 | 150 | 150 | 200 |
| FeO ratio | 0.278 | 0.285 | 0.28 | 0.275 | 0.27 | 0.288 | 0.318 |
| Thickness/mm | 1.4 | 1.6 | 1.8 | 2 | 2.1 | 2.1 | 2.1 |
| $Y_A$/% | 80.3 | 80.0 | 80.2 | 80.3 | 81.0 | 80.6 | 80.6 |
| $T_G$/% | 60.4 | 59.5 | 59.6 | 59.2 | 61.4 | 60.1 | 59.6 |
| $T_G/Y_A$ ratio | 0.752 | 0.744 | 0.743 | 0.737 | 0.758 | 0.746 | 0.739 |
| $T_{UV}$/% | 32.8 | 38.7 | 39.5 | 40.0 | 40.1 | 40.3 | 40.3 |
| Dw/nm | 539.0 | 535.0 | 530.0 | 509.0 | 526.0 | 516.0 | 501.0 |
| Pe/% | 4.3 | 4.3 | 4.3 | 2.2 | 2.2 | 2.2 | 2.2 |
| T850/% | 45.6 | 44.2 | 44.1 | 42.7 | 44.9 | 44.8 | 42.0 |
| T1550/% | 57.9 | 56.4 | 56.4 | 55.2 | 58.8 | 56.1 | 57.0 |
| INT1100-2200 | 61680 | 60035 | 59950 | 58865 | 61870 | 57890 | 60520 |
| | 8 | 9 | 10 | 11 | 12 | 13 | 14 |
| $SiO_2$ | 69.4 | 69.2 | 70 | 69.4 | 70.2 | 70 | 70.2 |
| $Al_2O_3$ | 1.5 | 1.5 | 1.6 | 1.5 | 1.6 | 1.6 | 1.6 |
| $Na_2O$ | 12.5 | 14.2 | 14 | 12.5 | 14.4 | 14.5 | 14.4 |
| $K_2O$ | 3 | 0.5 | 0.5 | 3 | 0.5 | 0.5 | 0.5 |
| MgO | 3.2 | 0.4 | 3.2 | 3.2 | 3.2 | 3.2 | 3.2 |
| CaO | 8.7 | 12.5 | 8.8 | 8.7 | 8.8 | 8.8 | 8.8 |
| $TiO_2$ | 0.05 | 0.05 | 0.05 | 0.10 | 0 | 0 | 0 |
| $T\text{-}Fe_2O_3$ | 0.78 | 0.78 | 0.70 | 0.902 | 0.950 | 0.744 | 0.950 |
| $CeO_2$ | 0.88 | 0.88 | 1.20 | 0.65 | 1.40 | 1.70 | 1.40 |
| $SO_3$ | 0.16 | 0.15 | 0.16 | 0.18 | 0.17 | 0.17 | 0.17 |
| MnO/mass ppm | 190 | 190 | 250 | 150 | 80 | 40 | 80 |
| FeO ratio | 0.33 | 0.349 | 0.326 | 0.283 | 0.27 | 0.288 | 0.26 |
| Thickness/mm | 2.1 | 2.1 | 2.3 | 4 | 4 | 4 | 1.8 |
| $Y_A$/% | 80.5 | 80.4 | 80.5 | 70.5 | 72.1 | 72.0 | 81.0 |
| $T_G$/% | 58.9 | 58.0 | 58.5 | 40.4 | 40.3 | 44.3 | 59.5 |
| $T_G/Y_A$ ratio | 0.732 | 0.721 | 0.727 | 0.573 | 0.560 | 0.615 | 0.735 |
| $T_{UV}$/% | 40.3 | 40.3 | 40.3 | 33.1 | 32.9 | 40.1 | 38.9 |
| Dw/nm | 501.0 | 500.0 | 505.0 | 495.8 | 513.8 | 495.7 | 512.6 |
| Pe/% | 2.2 | 2.2 | 2.2 | 3.3 | 2.8 | 4.4 | 1.5 |
| T850/% | 41.3 | 40.2 | 41.9 | 45.7 | 45.6 | 45.9 | 47.8 |
| T1550/% | 55.1 | 55.1 | 54.5 | 58.8 | 55.6 | 59.2 | 57.3 |
| INT1100-2200 | 58690 | 55630 | 57780 | 56799 | 55197 | 59921 | 61964 |

* The units of all components except MnO are expressed in mass %. Ya: Visible light transmittance Tg: Total solar energy transmittance Tuv: Utraviolet transmittance Dw: Dominant wavelength Pe: Excitation purity T850: Transmittance at the wavelength of 850 nm T1500: Transmittance at the wavelength of 1500 nm INT1100-2200: Integrated value of transmittance of every 1 nm in the wavelength from 1100 to 2200 nm

TABLE 3

Comparative Examples (single plate)

|  | 61 | 62 | 63 | 64 | 65 |
|---|---|---|---|---|---|
| $SiO_2$ | 71.7 | 71.0 | 70.4 | 71.5 | 71.2 |
| $Al_2O_3$ | 2.1 | 1.9 | 1.5 | 1.7 | 2.1 |
| $Na_2O$ | 13.0 | 12.9 | 14.2 | 12.9 | 13.0 |
| $K_2O$ | 0.9 | 0.8 | 0.6 | 0.8 | 1.0 |
| MgO | 3.9 | 4.4 | 3.2 | 3.7 | 3.6 |
| CaO | 8.3 | 8.6 | 8.4 | 6.8 | 8.1 |
| $TiO_2$ | 0.04 | 0.08 | 0.05 | 0.35 | 0.07 |
| $T-Fe_2O_3$ | 0.10 | 0.46 | 0.75 | 0.61 | 0.86 |
| $CeO_2$ | 0 | 0 | 0.85 | 1.60 | 0.10 |
| $SO_3$ | 0.2 | 0.18 | 0.19 | 0.15 | 0.18 |
| MnO/mass ppm | 60 | 190 | 200 | 40 | 130 |
| FeO ratio | 0.242 | 0.278 | 0.256 | 0.367 | 0.261 |
| thickness/mm | 2.1 | 2.1 | 2.1 | 2.1 | 2.1 |
| $Y_A$/% | 91.0 | 58.8 | 81.9 | 81.7 | 79.5 |
| $T_G$/% | 99.2 | 71.7 | 63.2 | 62.5 | 61.7 |
| $T_G/Y_A$ ratio | 1.090 | 1.219 | 0.772 | 0.765 | 0.776 |
| Dw/nm | 519 | 511 | 526 | 536 | 514 |
| T850/% | 86.6 | 60.3 | 46.8 | 47.5 | 46.9 |
| T1550/% | 88.2 | 69.8 | 57.8 | 58.3 | 59.4 |
| INT1100-2200 | 97750 | 75390 | 64222 | 62770 | 63290 |

* For the notation of each section, Table 2 is to be referred.

The desired properties are obtained in Examples 1 to 14, while the desired properties are not obtained in Comparative Examples 61 to 65. For example, with respect to the integrated value of the transmittance in the wavelength region of 1100 to 2200 nm, that of each Example is 62000 or less, but that of each Comparative Example exceeds 62000. Moreover, in Examples 1 to 10, the values of $T_G/Y_A$ are 0.76 or less, which are different from Comparative Examples 61 to 65, although the glass sheets thereof are thin. Consequently, it is understood that the whole composition is adjusted properly in each Example.

According to equations (1) and (2), when the thickness t is 2.1 mm, $T-Fe_2O_3$ should be adjusted to be within 0.75 to 0.85% and the content of $CeO_2$ should be adjusted to be 0.3 to 1.3%. In this case, the preferable FeO ratio is from 0.275 to 0.35. No composition of any Comparative Example satisfies these conditions. In contrast, the composition of each Example except Example 5 satisfies equations (1) and (2) regardless of the thickness, and the FeO ratio also falls in the above range.

The two of the glass sheet obtained above were bonded together using an interlayer film (poly(vinyl butyral) film) to form a laminated glass. However, laminated glasses of Comparative Examples 75 and 76 were produced using the glass sheets shown in Table 6.

The properties of the laminated glasses measured are shown in Tables 4 and 5.

TABLE 4

Examples (laminated glas)

|  | 21 | 22 | 23 | 24 | 25 | 26 | 27 |
|---|---|---|---|---|---|---|---|
| Combination of glass plate | (2) + (3) | (3) + (3) | (3) + (4) | (4) + (4) | (5) + (5) | (2) + (3) | (3) + (3) |
| Thickness/mm | 1.8 + 1.6 | 1.8 + 1.8 | 1.8 + 2.0 | 2.0 + 2.0 | 2.1 + 2.1 | 1.8 + 1.6 | 1.8 + 1.8 |
| $Y_A$/% | 70.1 | 70.1 | 70.2 | 70.5 | 71.0 | 70.4 | 70.6 |
| $T_G$/% | 42.4 | 42.1 | 41.8 | 41.7 | 40.9 | 39.8 | 39.3 |
| $T_G/Y_A$ ratio | 0.605 | 0.601 | 0.595 | 0.591 | 0.576 | 0.565 | 0.557 |
| T850/% | 21.6 | 21.5 | 20.3 | 20.1 | 19.8 | 18.3 | 17.1 |
| T1550/% | 34.9 | 34.8 | 33.4 | 33.2 | 33.4 | 30.8 | 27.9 |
| INT1100-2200 | 32950 | 32860 | 32370 | 32210 | 30520 | 28330 | 25830 |
| Ttf/% | — | 40.0 | — | — | 39.6 | — | — |

|  | 28 | 29 | 30 | 31 | 32 |
|---|---|---|---|---|---|
| Combination of glass plate | (3) + (4) | (4) + (4) | (5) + (5) | (3) + (5) | (10) + (10) |
| Thickness/mm | 1.8 + 2.0 | 2.0 + 2.0 | 2.1 + 2.1 | 2.1 + 1.8 | 2.3 + 2.3 |
| $Y_A$/% | 71.4 | 70.7 | 70.6 | 71.9 | 71.1 |
| $T_G$/% | 44.2 | 43.0 | 41.6 | 41.9 | 40.8 |
| $T_G/Y_A$ ratio | 0.619 | 0.608 | 0.589 | 0.583 | 0.574 |
| T850/% | 24.2 | 22.4 | 19.5 | 20.6 | 20.6 |
| T1550/% | 36.6 | 34.7 | 32.5 | 33.7 | 33.8 |
| INT1100-2200 | 33420 | 32520 | 31450 | 32320 | 32350 |
| Ttf/% | — | — | — | 40.0 | 39.9 |

* For the notation of each section, Table 2 is to be referred, except Trf: Transmittance for thermal feeling

TABLE 5

Comparative Examples (laminated glass)

|  | 71 | 72 | 73 | 74 | 75 | 76 |
|---|---|---|---|---|---|---|
| Combination of glass plate | (63) + (63) | (62) + (62) | (61) + (65) | (62) + (64) | (81) + (81) | (82) + (82) |
| Thickness/mm | 2.1 + 2.1 | 2.1 + 2.1 | 2.1 + 2.1 | 2.1 + 2.1 | 2.2 + 2.2 | 1.8 + 1.8 |
| $Y_A$/% | 73.9 | 78.3 | 78.8 | 75.9 | 71.4 | 72.2 |
| $T_G$/% | 45.5 | 53.6 | 57.0 | 49.4 | 43.0 | 44.1 |
| $T_G/Y_A$ ratio | 0.616 | 0.685 | 0.723 | 0.651 | 0.602 | 0.611 |
| T850/% | 27.2 | 37.3 | — | — | — | — |

TABLE 5-continued

| | Comparative Examples (laminated glass) | | | | | |
|---|---|---|---|---|---|---|
| | 71 | 72 | 73 | 74 | 75 | 76 |
| T1550/% | 37.7 | 47.4 | — | — | — | — |
| INT1100-2200 | 34640 | 43090 | — | — | — | — |
| Ttf/% | — | — | — | — | 45.0 | 46.0 |

* For the notation of each section, Tables 2 and 4 are to be referred.

TABLE 6

Compositions of single plates for laminated glasses of Comparative Examples

| | 81 | 82 |
|---|---|---|
| $SiO_2$ | 71.73 | 71.73 |
| $Al_2O_3$ | 0.12 | 0.12 |
| $Na_2O$ | 13.78 | 13.78 |
| MgO | 4.00 | 4.00 |
| CaO | 8.64 | 8.64 |
| $Cr_2O_3$ | 0.0003 | 0.0003 |
| $La_2O_3$ | 0.0009 | 0.0009 |
| $SO_3$ | 0.14 | 0.14 |
| $TiO_2$ | 0.017 | 0.016 |
| T—$Fe_2O_3$ | 0.776 | 0.834 |
| $CeO_2$ | 0.89 | 0.913 |
| FeO ratio | 0.243 | 0.268 |

*The content of each component is expressed in mass %.

The desired optical properties are obtained in Examples 21 to 32.

INDUSTRIAL APPLICABILITY

The present invention provides a near-infrared absorbent green glass composition which reduces the thermal feeling that affects comfort in cars or rooms and has excellent optical properties totally, and a laminated glass using the glass composition. The preset invention thus has a high utility value in the technical field of window glass as well as in other technical fields.

The invention claimed is:

1. A near-infrared absorbent green glass composition comprising, in mass %:
   65 to 80% $SiO_2$,
   0 to 5% $B_2O_3$,
   0 to 5% $Al_2O_3$,
   0 to 10% MgO,
   5 to 15% CaO,
   10 to 18% $Na_2O$,
   0 to 5% $K_2O$,
   0 to 2% $TiO_2$,
   0.05 to 0.5% $SO_3$,
   0.98 to 1.3% T-$Fe_2O_3$ which means a total iron oxide amount in terms of $Fe_2O_3$,
   0.65 to 2.0% $CeO_2$ and, in mass ppm,
   300 ppm or less MnO,
   wherein a total content of MgO and CaO is from 5 to 20 mass %, a total content of $Na_2O$ and $K_2O$ is from 10 to 20 mass %, a FeO ratio represented by a mass ratio of FeO converted into $Fe_2O_3$ relative to said T-$Fe_2O_3$ is from 0.275 to 0.35, and at least one of the following a) and b) is satisfied:
   a) when the near-infrared absorbent green glass composition is formed to have a thickness in the range of 1.3 to 2.4 mm, a visible light transmittance measured by using CIE illuminant A is at least 80%, a total solar energy transmittance is 62% or less, a dominant wavelength measured by using CIE illuminant C is from 500 to 540 nm, and an integrated value obtained by integrating transmittances of every 1 nm in the wavelength from 1100 to 2200 nm is 62000 or less;
   b) when the near-infrared absorbent green glass composition is formed to have a thickness in the range of 3 to 5 mm, a visible light transmittance measured by using CIE illuminant A is at least 70%, a total solar energy transmittance is 45% or less, a dominant wavelength measured by using CIE illuminant C is from 495 to 540 nm, and an integrated value obtained by integrating transmittances of every 1 nm in the wavelength from 1100 to 2200 nm is 62000 or less.

2. The near-infrared absorbent green glass composition according to claim 1, which is formed to have a thickness in the range of 1.3 to 1.8 mm.

3. The near-infrared absorbent green glass composition according to claim 1, wherein the content of MnO is from 30 to 300 mass ppm.

4. The near-infrared absorbent green glass composition according to claim 1, wherein in at least one of said a) and said b), an ultraviolet transmittance is 42% or less.

5. The near-infrared absorbent green glass composition according to claim 4, wherein the ultraviolet transmittance is 40% or less when the near-infrared absorbent green glass composition is formed to have a thickness in the range of 1.3 to 2.0 min.

6. A laminated glass formed by laminating at least two glass sheets through a thermoplastic resin layer, wherein at least one of said glass sheets comprises the near-infrared absorbent green glass composition according to claim 1.

7. The laminated glass according to claim 6, wherein at least two of the said glass sheets comprise the near-infrared absorbent green glass composition according to claim 1.

8. The laminated glass according to claim 6, wherein a visible light transmittance measured by using CIE illuminant A is 70% or more and a total solar energy transmittance is 45% or less.

9. The laminated glass according to claim 8, wherein a ratio of said total solar energy transmittance relative to said visible light transmittance is 0.60 or less.

10. The laminated glass according to claim 6, wherein a transmittance at the wavelength of 1550 nm is 37% or less.

11. The laminated glass according to claim 6, wherein an integrated value obtained by integrating transmittances of every 1 nm in the wavelength from 1100 to 2200 nm is 34000 or less.

12. The laminated glass according to claim 6, wherein a transmittance for thermal feeling is 44% or less.

* * * * *

UNITED STATES PATENT AND TRADEMARK OFFICE
CERTIFICATE OF CORRECTION

PATENT NO. : 7,820,575 B2
APPLICATION NO. : 10/581980
DATED : October 26, 2010
INVENTOR(S) : Nagashima Page 1 of 1

It is certified that error appears in the above-identified patent and that said Letters Patent is hereby corrected as shown below:

Column 14, lines 41-42 (claim 5): "1.3 to 2.0 min" should read --1.3 to 2.0 mm--.

Signed and Sealed this
Eighth Day of March, 2011

David J. Kappos
*Director of the United States Patent and Trademark Office*